United States Patent [19]
Jacobsen et al.

[11] Patent Number: 5,627,242
[45] Date of Patent: May 6, 1997

[54] PROCESS FOR CONTROLLING GAS PHASE FLUIDIZED BED POLYMERIZATION REACTOR

[75] Inventors: Lance L. Jacobsen, Scott Depot; Kiu H. Lee, South Charleston; John R. Parrish, Cross Lanes, all of W. Va.

[73] Assignee: Union Carbide Chemicals & Plastics Technology Corporation, Danbury, Conn.

[21] Appl. No.: 623,016

[22] Filed: Mar. 28, 1996

[51] Int. Cl.$^6$ .................................................. C08F 2/34
[52] U.S. Cl. .............................. 526/60; 526/61; 526/901
[58] Field of Search .................................. 526/60, 61, 901

[56] References Cited

PUBLICATIONS

K.B. McAuley, et al., "Optimal Grade Transitions in a Gas Phase Polyethylene Reactor", AIChE, Journal, Oct. 1992, vol. 38, No. 10, pp. 1564–1576.

Abstract No. DE 4241530, Buna A.G., Jun. 16, 1994.

J.A. Debling, et al., "Dynamic Modeling of Product Grade Transitions for Olefin Polymerization Processes", AICHhE Journal, Mar. 1994, vol. 40, No. 3, pp. 506–520.

*Primary Examiner*—Thomas R. Weber
*Attorney, Agent, or Firm*—B. L. Deppenbrock

[57] ABSTRACT

Control of a gas phase polymerization reactor is performed with the product melt index, the reaction temperature, and the partial pressure of the controlling reactant.

11 Claims, 5 Drawing Sheets

5,627,242

PROCESS FOR CONTROLLING GAS PHASE FLUIDIZED BED POLYMERIZATION REACTOR

FIELD OF THE INVENTION

The invention relates to a process for controlling the operation of a gas phase fluidized bed reactor to reduce the time and volume of transient operation when switching from one type of product to another or in controlling fluctuations in steady state manufacture.

BACKGROUND OF THE INVENTION

The fluidized bed technology in olefin polymerization reactors used today can be adjusted to produce a wide variety of products. This is particularly true for polyethylene manufacture. It is not unusual to demand that one system produce resins that can be used in injection molded, blow molded, roto-molded products, wire coating, piping and tubing, and films. Fluidized bed technology can be used to make a wide variety of polyolefin products, e.g., homopolymers and copolymers of polyethylene, polypropylene, $C_4$–$C_{12}$ alpha olefins; ethylene-propylene-diene monomer (EPDM), polybutadiene, polyisoprene, and other rubbers. Generally, the polymer products made by a given reactor system use the same reactants but in different ratios and at different temperatures. Each of these polymer products can be made with a number of different resin properties, or grades. Each grade of polymer product has a narrow limit on its properties, e.g., density and melt index.

The length of time a reactor is used to make a particular type of polymer depends on the market demand for the product. Some products can be run for weeks without change. Other products are made for much shorter periods of time. Unfortunately, industrial reactors require time to adjust to the new conditions (e.g., temperature, reactant pressures, and reactant ratios) and produce material in the interim that is constantly changing but not within the properties (e.g., melt index and density) of either the old product or the new one. New products cannot be made instantaneously and require a quantifiable period of transiency in becoming adjusted to the new, desired conditions. Similarly, reactors operating at fixed conditions, i.e., at "steady state", can experience fluctuations that can result in the production of "offgrade" material. This offgrade material that; represents an economic loss and is desirably minimized.

Generally, industrial control systems for gas phase, fluidized bed polymerization reactors are designed to permit the operators to control the reactor by allowing the operators to select a desired melt point index and density. Correlations of these properties are usually well known by the operators and those in the art for the particular reactor design and catalyst used.

The prior art has devised a number of methods to reduce the transient, offgrade material. These methods typically involve some combination of adjusting the automatic flow/ratio controllers to a new value either at or above the ultimately desired value ("dial-in transition" and "overshoot")), removing the reactant gas entirely ("inventory blow down"), reducing the level of the catalyst ("low bed"), and adding a nonreactive gas ("nitrogen addition").

DE 4,241,530 describes using a kill gas to stop a polymerization reaction, blowing the gas inventory for that reaction out of the reactor, and rebuilding a new gas inventory for a new product. This method reduces transition material. The costs associated with throwing away the old gas inventory and rebuilding a new inventory are too high for commercial transitions between closely related grades. Thus, most transitions between grades of the same material are performed by adjusting the reaction conditions.

McAuley et al. ("Optimal Grade Transitions in a Gas Phase Polyethylene Reactor", *AIChE J.*, Vol. 38, No. 10: 1992, pp. 1564–1576) discloses three manual, labor-intensive transition strategies for gas phase polyethylene reactors. The first is an adjustment to the controls to overshoot the melt index and density values. The hydrogen feed and co-monomer feeds are increased to meet the designated properties. The actual desired setpoint values are directed when the sensors indicate that the desired product is being produced. The second is an increase in temperature and manipulation of the slow vent to move the melt index of the produced product. The third is a drop in the catalyst level of the lower bed while keeping the bed resin residence time at a constant to reduce offgrade production.

Debling, et al., "Dynamic Modeling of Product Grade Transitions for Olefin Polymerization Processes", *AIChE J.*, vol. 40, no. 3: 1994, pp.506–520) compares transition performance of different types of polyethylene reactors. The article discloses seven separate manual, labor intensive transition strategies: (1)dialing in the final aim transition; (2) gas inventory blow down and simple dial-in transition; (3) low bed and simple dial-in transition; (4) gas inventory blow down and overshoot of melt index and density transition; (5) low bed, gas inventory blow down, land overshoot transition; (6) low bed and overshoot transition; and (7) gas inventory blow down, overshoot, and nitrogen addition transition.

Despite these wide variety of available schemes, there is a continuing need and desire to reduce the amount of offgrade material produced during transition to a new product grade or during steady state manufacture.

SUMMARY OF THE INVENTION

It is an object of the invention to provide a ;method for reducing the amount of offgrade material produced during grade transition or during steady state manufacture.

It is another object of the invention to provide a method for reducing the transition time and volume of transient material when switching from one polymer product; to another product of similar chemistry but different properties.

In accordance with these and other objects of the invention that will become apparent herein, a process according to the invention is used in a reactor with adjustable setpoint values for melt index, product reaction temperature, reactant partial pressures, and catalyst levels in the reactor producing a polymerization product in a fluidized bed of catalyst when switching from a first product made at a first temperature and first set of conditions to a second product made at a second temperature and set of conditions, whether in transition between products or during steady state manufacture of a specific product experiencing "within grade" fluctuations, and comprises the steps of:

(a) comparing the first product reaction temperature and the second product reaction temperature, change the product reaction temperature setpoint to the second product reaction temperature if said second product reaction temperature is lower than said first product reaction temperature, (b) setting a melt index setpoint that is either 0–150% higher or 0–70% lower than the desired second product melt index value, (c) setting a reaction temperature setpoint that is: 1°–15° C. above the desired second product reaction temperature if the second product melt index value is higher than the first product melt index value, or 1°–15° C. below the actual second product reaction temperature if the second product melt index is lower than the first product melt index, (d) setting a product rate-limiting reactant partial pressure setpoint that is: 1–25 psig either below the first product rate-limiting reactant partial pressure if the, second product melt index value is higher than the first product melt index value, or above the first product rate-limiting reactant partial pressure if the second product melt index value is lower than the first product melt index value;

(e) maintaining said melt index setpoint, temperature setpoint, and rate-limiting reactant partial pressure setpoint values until said polymerization product exhibits an average melt index and average product density with an acceptable range from the desired second product melt index value and second product density value;

(f) changing said melt index setpoint to the desired second product melt index value;

(g) changing said product ice action temperature setpoint to a value that is: (i) 0°–15° C. above said desired second product reaction temperature if the second product melt index value is higher than the first product melt index value, or (it) 0°–15° C. below said desired second product reaction temperature. If the second product melt index value is lower than the first product melt index value;

(h) changing said rate-limiting partial pressure setpoint to a value that is: (i) 0–25 psig either below the desired second product rate-limiting partial pressure if the second melt index value is higher than the first melt index value, or (it) 0–25 psig above the second product rate-limiting partial pressure if the second melt index value is lower than the first melt index value; and (i) changing the reaction temperature setpoint and the rate-limiting reactant partial pressure setpoint values to the desired second product reaction temperature and second rate-limiting reactant partial pressure value when the reaction product exhibits an average melt index value within acceptable limits of the second product melt index value.

By the present process, the transient time and amount of offgrade material produced during that transient period is reduced through control of the reaction temperature setpoint as well as the setpoint pressure of the rate-limiting monomer concentration. The control system can further reduce the transition time by providing for removal of hydrogen in the reactant gas. The control process of the invention is well suited for automated control over the polymerization reaction system using computer monitoring of the product properties and adjustments to the setpoint values.

DETAILED DESCRIPTION

Figure 1:
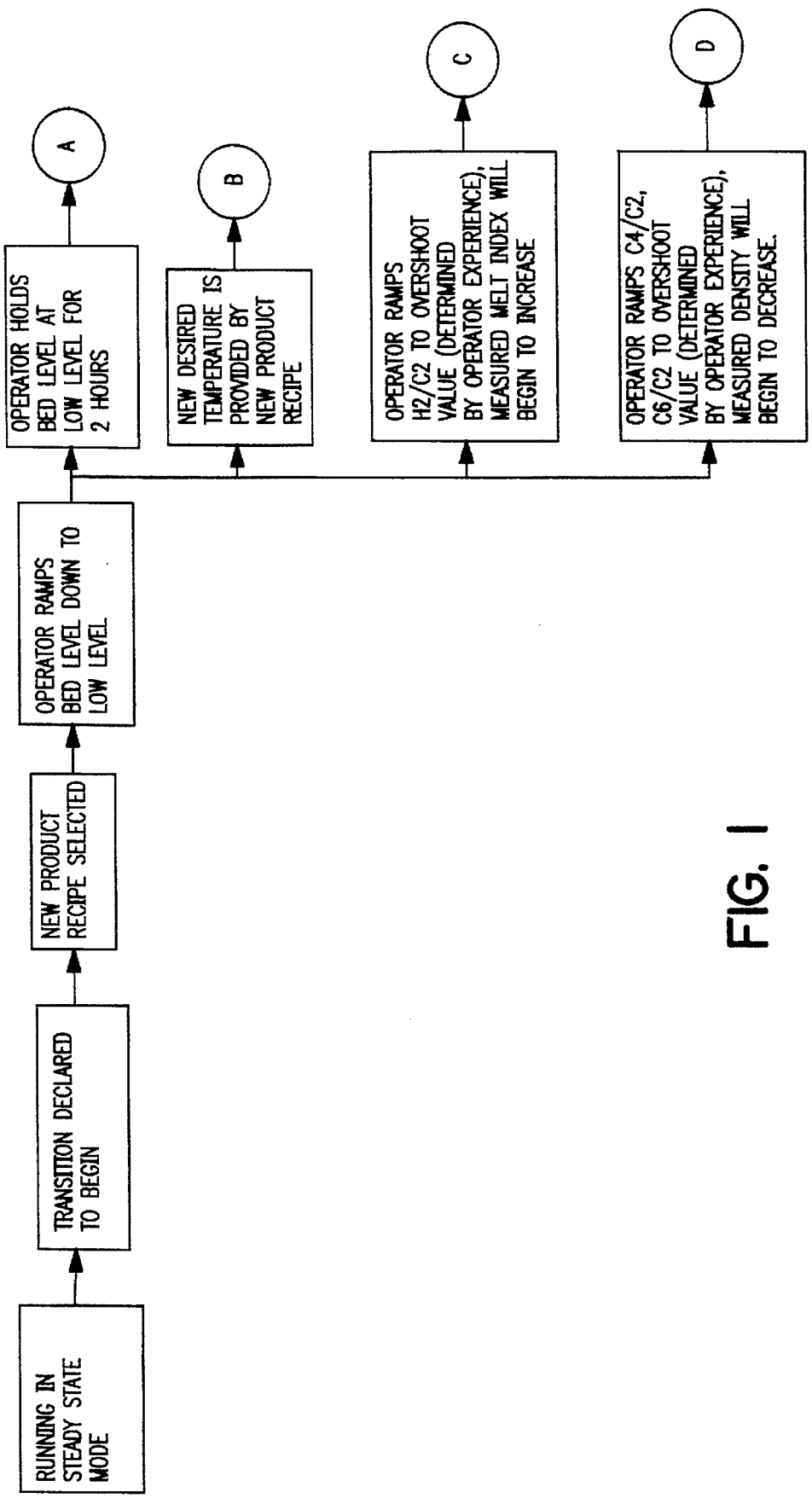
FIGS. 1 and 2 are a flowchart illustrating the prior art steps used to conduct a manual transition from a first product to a second product.

The present invention is directed to a method for reducing the volume of offgrade material in an olefin polymerization reactor employing a rate-limiting olefin gas. Specifically, the volume of offgrade material produced when switching from a first product grade to a second product grade or from fluctuations within a designated product "grade" during steady state manufacture are reduced by adjusting the temperature setpoint as well as the partial pressure setpoint on the rate-limiting reactant. The combination of these two controls accelerates the speed with which the reactor moves toward the production of the desired product. The volume of offgrade material is, of course, directly related to the time it takes for the reactor to change from a first set of conditions (temperature, partial pressure, monomer ratios, etc.) to a second set of desired conditions. The partial pressure of the rate-limiting reactant is one indicia.

The hydrogen concentration in the gaseous reactor inventory can also be used to reduce transition time. Because hydrogen terminates the polymerization reaction, even small quantities of hydrogen in the reactor can have a pronounced impact on the grade of the average product melt index. The hydrogen concentration can be adjusted by bleeding off a relatively small quantity, e.g., 1–8 wt % preferably about 3–6 wt %, of gas inventory or passing a proportion of the total gas inventory over hydrogenation catalyst in a satellite system with a fixed or fluidized bed. Hydrogenation will convert some quantity of the olefin to nonreactive alkane which would constitute a diluent.

The present control process can be performed on a variety of reactor equipment suitable for performing catalytic, gas phase, fluidized bed polymerization. One or more reactors can be used in sequence or in parallel. Usually, such reactors will be designed for commercial operation and will have suitable controls allowing adjustable setpoint values for melt index, product, reaction temperature, reactant ratios, filed ratios, reactant partial pressures, and catalyst levels in the reactor. The most preferred reactor is sold under the trademark UNIPOL® and is available from Union Carbide Corporation, Danbury, Conn. See also, U.S. Pat. Nos. 4,302, 565 and 4,482,687, the disclosures of which are herein incorporated by reference.

Any polymerization catalyst that can be used in the reactor can be controlled with the process control sequence of the present invention. Suitable catalysts includes those of transition metals, Ziegler-Natta, metallocene, and rare earth components. The catalyst can be soluble, insoluble, supported, or unsupported.

Polymers which can be produced using the method of the present invention are generally olefin polymers. Exemplary products include ethylene homopolymers; propylene homopolymers; copolymers of ethylene and at least one $C_3$–$C_{12}$ alpha olefin; terpolymers of ethylene, and at least one $C_3$–$C_{12}$ alpha olefin and a diene. Examples of specific product polymers that can be made include ethylene-propylene copolymer, ethylene-butene copolymer, ethylene-hexane copolymer, and ethylenepropylene-diene rubbers, copolymers of propylene and at least one $C_4$–$C_{12}$ alpha olefin (such as propylene-butene copolymer and propylene-hexane copolymer), polybutadiene, and polyisoprene.

The reaction conditions and catalysts used in the controlled process are those conventionally used to make the designated products. In general, the gas inventory in the reactor will be completely replaced up to about 5 times per hour (<5 GHSV), preferably about 0.5–3 GHSV. The catalyst inventory in the fluidized bed turns over every 2–4 hours (0.25–0.5 CSV).

The control process of the invention uses the setpoint partial pressure of the rate-limiting reactant to accelerate transition to the desired product. For any specific product, the rate-limiting reactant will be known to those in the art. In general, however, ethylene is the rate-limiting reactant when polymerized with butene, hexene, octene, or a combination of butene and hexene; propylene is the rate-limiting reactant when polymerized with butene, hexene, octene, or a combination of butene and hexene; ethylene is the rate-limiting reactant when polymerized with propylene when making ethylene-propylene rubber (EPR). For homopolymers, the rate-limiting reactant is the monomer concentration. The invention is conveniently described herein with reference to copolymers of ethylene and hexene in which ethylene is the rate-limiting reactant.

Transition generally starts from an initial operating condition in which a first product exhibiting a first product melt index value (or any other expression of a change in molecular weight, e.g., flow index, flow ratios, and related standard methods) is made at a first product reaction temperature setpoint and a first rate-limiting reactant concentration setpoint. The desired second product will have different melt index and reactant feed ratio values that are either higher or lower. Changes in the temperature and rate-limiting reactant partial pressure values are used to reduce the time required for the catalyst bed to begin producing the new product. Importantly, transition can occur between steady state operating conditions or within a subset of conditions within acceptable upper and lower limits of a given steady state manufacturing process.

Certain setpoint changes, are applicable to initiating and controlling the transition from one product to another. Depending on the specific system and the extent of available computer control over the process, operators will be able to, change the setpoints for melt index, reaction temperature, hydrogen feed rate, rate-limiting reactant feed rate and/or partial pressure, comonomer feed rate and/or partial pressure, and catalyst level in the reactor.

Generally, a change in desired melt index depends on the rate at which hydrogen is introduced to the system and is proportional to the change in reaction temperature setpoint. Conversely, a rate-limiting reactant partial pressure and rate of hydrogen removal are inversely proportional to the change in melt index. Stated another way, an increase in melt index value is accompanied by an increase in temperature but a decrease in rate-limiting reactant partial pressure and hydrogen removal rate.

For the control process of the invention, the temperature setpoint can be changed in advance of or simultaneously with a change in ethylene partial pressure and hydrogen feed rate setpoints to cause a change in the average melt index of the reaction product within the catalyst bed. A change in the melt index setpoint, regardless of whether it is set directly or calculated, should be about 0–150% higher than the target setpoint for the new product if the second product's melt index is higher than the first product's or 0–70% lower if the second product's melt index is lower than the first product's melt index. The change in melt index will be accompanied by a change in the hydrogen concentration.

Average melt index can be determined with measurements on samples withdrawn and tested or by in-line, automated samplers. Actual sampling can be performed every 2–4 hours. In line samplers will perform such tests 3–4 times per hour.

Control over the temperature and rate-limiting reactant setpoints can then be used to accelerate rate of transition to the new product without exceeding the desired equilibrium reaction conditions within the catalyst bed. After the new melt index setpoint is set, the temperature setpoint is changed to a value within the range of about 1°–15° C. from the target setpoint for the steady-state manufacture of the new product (above the old setpoint if the melt index is increasing, or below the old setpoint if the melt index is decreasing) and changing the ethylene partial pressure setpoint to a value within the range from about 1–25 psig of the target setpoint (below the old setpoint if the melt index is increasing, or above the old setpoint if the melt index is decreasing). The actual implementation of such changes will depend oft the existing hardware, but changes can occur by discrete step increments or in a smoothly varying change.

When the temperature and ethylene partial pressure setpoint values are reached, the reactor is maintained within ±10%, preferably within ±5% of the setpoint values until the reaction product within the catalyst bed begins to approach the target melt index value for the new product. Total reactor pressure can also be allowed to fluctuate within designated upper and lower limits, generally about ±20% and preferably about within ±10%. The additional control over the target reaction temperature and the rate-limiting partial pressure setpoints will increase the rate of transition and reduce the amount of time needed to begin making product within acceptable limits (i.e., melt index and density).

It should be remembered that the gaseous inventory in a polymerization reactor can be changed to the new target composition much more quickly than the catalyst bed can begin to produce the new product. For example, the gas composition can be adjusted in about 15 minutes, but the reactor will not generally be producing the new product for 2–6 hours even when controlled by the process of the invention. This inertia by the bed is quantifiable through appropriate, known mass transfer differential equations which are used to generate computerized models of the reaction system. Thus, the changes in temperature and rate-limiting reactant partial pressure act as forces on the reaction, n system to cause change.

When the product melt index, as reflected by sampling, is at a point where the bed inertia suggests a change or is within acceptable upper and lower limits of the desired product, the setpoints are changed back to the steady-state target setpoints for the new product so the reactor can begin to achieve steady state operation with a consistent product grade of polymer. The art refers to this reduction in rate of changes as the "return" phase of a transition, i.e., a return to steady state.

During the return phase, the temperature and rate-limiting reactant partial pressure are adjusted toward the steady state target values to reduce the force of change on the bed and approach steady state. The setpoint reaction temperature is readjusted to a value that is 0°–15° C. either below the target value if the melt index is rising to the new target value or above the target value if the melt index is decreasing toward the new target value. Similarly, the ethylene partial pressure is adjusted by 0–25 psig below the target value if the melt index is rising to the new target value or by 0–25 psig above the target value if the melt index is decreasing toward the new target value. Because the rate of change in the product melt index is being slowed and approach a value within acceptable upper and lower limits about a target melt; index value, the instantaneous melt index readings should be monitored often and carefully. When the reaction product melt index falls within the acceptable upper and lower limits, the temperature and ethylene partial pressure setpoints are set to the target values. The reactor is then controlled to maintain steady state operation.

In some cases, operator experience or computer models can be used to determine the time to change the setpoints acknowledging the risk that setpoint changes that are too early or too late will extend the return time, increase the transition time, and increase the amount of offgrade material produced.

Transition Control with Computer Model

Further reductions in the transition volume and less labor intensive control over steady state manufacture can be achieved by controlling the temperature, rate-limiting reactant partial pressure, and hydrogen removal setpoints from an existing computer model of the reactor. That model can be used as an expert database that will control the transition strategy and critical feed scheduling. Such a system will generally involve a series if "IF-THEN" statements and conditional branching looking for detailed responses from a database of previously identified answers based on the specific system being used. The details of generating a computer model of a reactor's transition and steady state operating properties are within the existing skill level of practitioners in the art, so no extensive discussion of the techniques and mathematical relationships is provided. See, Ignizio, *Introduction to Expert Systems: The Development and Implementation of Rule-Based Expert Systems*, McGraw-Hill (1991) the disclosure of which is herein incorporated by reference.

An expert control system is particularly useful for automating the control of the temperature, rate-limiting reactant, and hydrogen removal values and timing of any changes. For ease of explanation, the expert system is described with reference to a transition to a product with a higher melt index requiring an understated temperature setpoint ("undershoot") and overstated ("overshoot") rate-limiting reactant and hydrogen removal setpoints. Indeed, the hydrogen removal rate is generally set to "0" to retain all excess hydrogen. The same principles and concerns will apply to the opposite case, i.e., transition to a lower melt index requiring an understated temperature setpoint value and overstated rate-limiting reactant partial pressure and hydrogen removal setpoint values at the beginning of the transition.

The same control principles and controls used for transition between grades are also used to control steady state manufacture by monitoring the product properties and correcting the conditions if it appears that the product properties are beginning to shift away from a desired median toward one of the extremes of the acceptable limits. Automated monitoring of the produced product with a data table of the acceptable upper and lower limits as well as a median set of property values (e.g., the region in a product volume-properties graph where at least 50% of the product volume should fall) will permit the computer to take corrective value before offgrade material is produced. The system will monitor the product properties and, if necessary, reset the setpoints from initial values to new values as a way of forcing the reactor to make "in grade" material of consistent quality.

Use of a computer has a number of advantages over manual operation. At a minimum, automated controls reduce the need for attentive humans to take corrective action and makes the setpoint process easier. Importantly, computerized control permits an operator to enter new target melt point index and density values directly. With an appropriate database correlating those values to the reactor, catalyst, feed ratios, etc. the computer will interpret the necessary overshoot/undershoot of temperature, reactant partial pressures, and reactant ratios as well as hydrogen removal rate values.

As noted above, holding the overshoot value for too long or for too short increases the transition time and the volume of offgrade material that is produced. With a control system linked to an accurate computer model of the reactor by an appropriate series of "if-then" statements, the timing and duration of any overstated or understated setpoint values can be automatically controlled. It is particularly useful to have the model running on the same computer as the control system so that system data can be written more or less continuously to a common data table that is read by the control system for changes in setpoints and updated duration information. Such a model controlled transition is able to adjust setpoints from model reaction product information more often than is feasible with manual adjustments based on even inline property measurements. Transition times and offgrade material are thereby reduced to a minimum.

Figures

Figure 2:
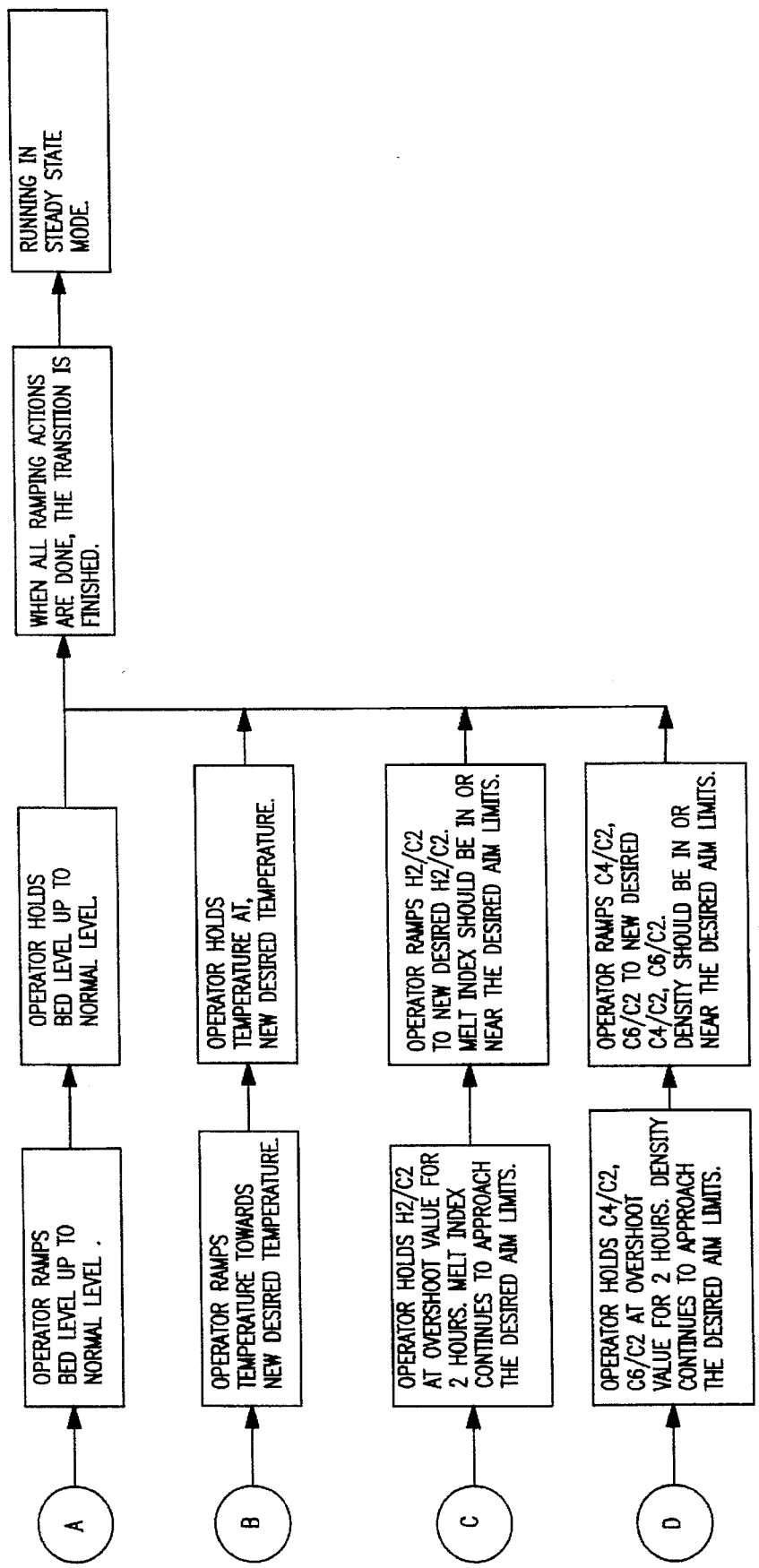

The invention can also be described with reference to the enclosed figures. FIGS. 1 and 2 depict a typical prior art flowchart for manual control of the transition from a first product to a second product of higher melt index and density.

The reactor is initially operating in a steady state making a first product. A decision is then made to transition to product 2 with a new "recipe", i.e., reactant ratios, reaction temperature, hydrogen/monomer ratios, etc. The operator then allows the catalyst bed level to drop to a low, transition state level. Four operations are then performed more or less simultaneously.

First, the catalyst bed is held at its low, transition state level for 2 hours and then increased gradually to its normal, production level. Second, a new temperature setpoint to make the second product is entered into the temperature control panel and allowed to change to that new setpoint and held constant. Third and finally, the operator selects new ratios of hydrogen to ethylene, the "hydrogen ratio", and for the comonomers that "overshoots" the desired value, i.e., the setpoint value is above the steady state, target value for the new product. Selection of the amount of overshoot is done by experience and held at that setpoint for about 2 hours. The ratios are then readjusted to the target values for the new product and held at that value until the reaction product exhibits the desired melt index and density values. Elapsed time for transition is about 12 hours.

Figure 3:
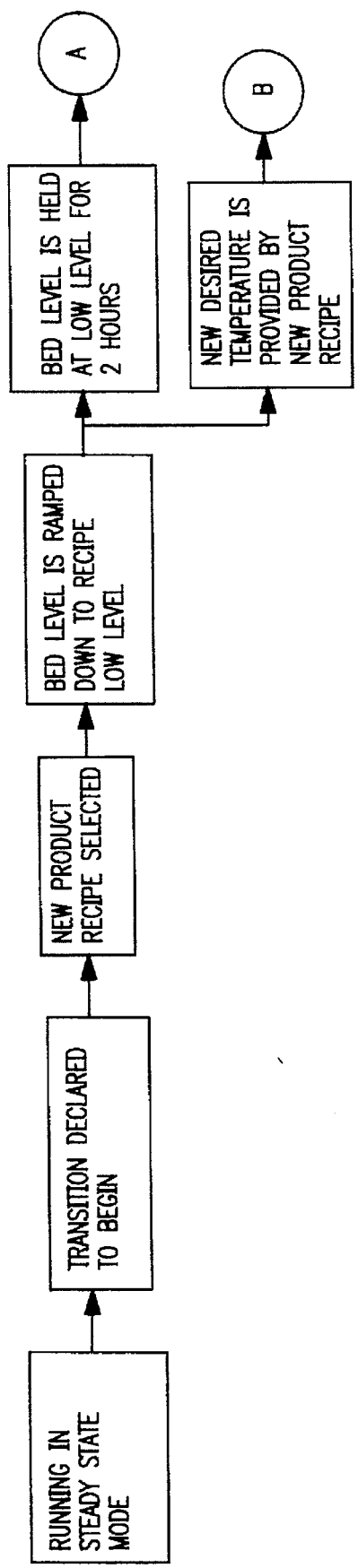
FIGS. 3–5 are a flowchart comparing manual control to an automated transition process employing links to an existing dynamic model of the reactor system.
Figure 4:
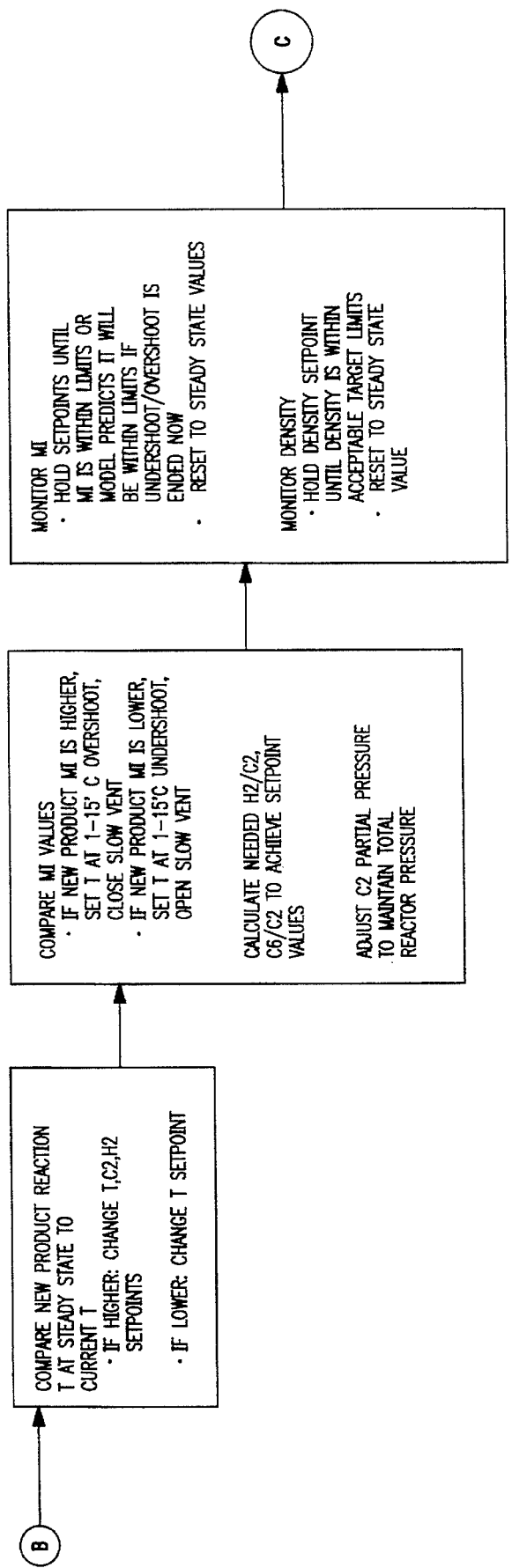
Figure 5:
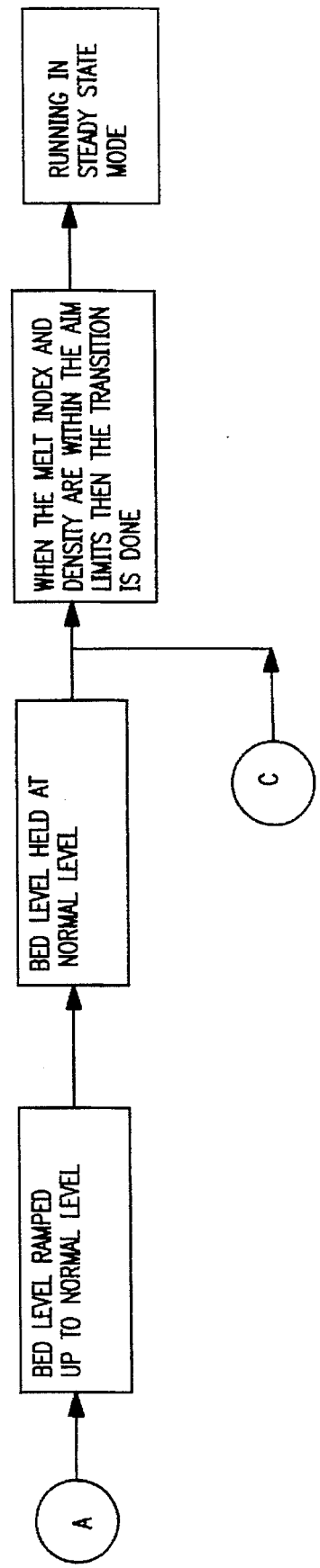

FIGS. 3–5 depict a flowchart of the process control of the invention. The initial steps are similar: the reactor is initially operating at steady state, the bed level is lowered to a transition level and held there for 2 hours.

Unlike the prior process where the new product temperature was merely set, the second product temperature is checked to see if it is above or below the first product temperature. If the second temperature is lower, the property setpoints are not changed, and the reactor temperature "ramped" down in stepped units or a smooth gradient. If the second temperature is higher than the first temperature, the property setpoints are changed at the same time the new temperature setpoint is entered. This analysis is particularly helpful in reactor operation. Because the resins are made near their sticking temperatures, operating the reactor at conservative temperatures during the transition helps to prevent sticking.

In expert process 2, the computer model is used to set the temperature, rate-limiting reactant partial pressure (e.g., ethylene partial pressure or "C2PP"), and hydrogen removal rate (e.g., slow vent) undershoot or overshoot values and duration from the melt index and density setpoint values entered into the computer model relative to the initial, steady state conditions. Changes in reaction product and reactor conditions are monitored and corrected to maintain an optimum transition path from the reactor model. Setpoints are changed as necessary to minimize transition time.

A computer-controlled system can also be applied as a quality control system to monitor the manufactured product and guide transitions back toward a desired steady state operating range, i.e., the first product (product at deviation) and the second product (target product) are within acceptable limits of the same particular desired product grade. Such systems can be controlled by the principles described herein to change the applicable setpoints and force the system to produce products within acceptable limits of the desired products.

The present invention can be explained with reference to the following examples.

EXAMPLES

Example 1

The control method of the invention was applied to a gas phase polymerization reaction between ethylene and hexene in a fluidized bed reactor. The transition from a first product grade to a second product grade required the following changes: a melt index increase of 56%, a density increase of 0.023 g/cm$^3$, and a temperature decrease of 20° C. The catalyst was changed from a titanium-based liquid to a titanium-based dry catalyst, but bed level was maintained constant.

Transition was begun by changing a number of control setpoint values. The melt index was set to 25% above the target value for the desired new grade. The density setpoint was set at 0.002 g/cm$^3$ below the target value for the new grade. The temperature was dropped in increments to 2° C. above the target temperature for making the new grade at steady state. The ethylene partial pressure was reduced by 46 psig. The molar ratios of hydrogen to ethylene ($H_2/C_2$) and hexene and ethylene ($C_6/C_2$) were continuously calculated from these new setpoints. Large amounts of hydrogen and hexene were added to the reactor.

After 5 hours, the bed average melt index was at aim grade. At this point, the melt index setpoint was changed to the final product's target value. The temperature setpoint was set down the remaining 2° C. to the final product's target reaction temperature. The ethylene partial pressure was moved up 3 psig. The slow vent was opened for 45 minutes to allow excess hydrogen from the reactor inventory.

After 6 hours, the bed average density was within acceptable limits of the target density. The density setpoint was then changed to the target value for the final product. The melt index remained at its target value, so all controls were switched to steady-state mode.

Example 2

A manual transition control indicative of the prior art method was applied to the gas phase reaction of example 1. The catalyst for the initial and final products was a dry, titanium-based catalyst.

The transition began by increasing the rate of hydrogen fed to the reactor until reaching an instantaneous melt index of 25% above the final target value. The hexene feed was manually opened until the density was at the target value. The temperature setpoint was dropped to the final target value. Total reactor pressure was maintained substantially constant. Large amounts of hexene and hydrogen were added.

After the melt index overshoot was reached, the $H_2/C_2$ ratio was maintained. Similarly, the $C_6/C_2$ ratio was maintained when the density fell within acceptable limits of the target value.

After 5 hours, the $H_2/C_2$ setpoint was changed to an estimate of the final value needed to make the melt index fall within target limits. No changes or manipulations were made to either the temperature or the slow vent. Ethylene partial pressure was controlled to maintain a roughly constant total pressure.

After 12 hours, the bed average density was within target limits. The $H_2/C_2$ and $C_6/C_2$ controls were set to steady state.

This old control method produced roughly twice the amount of offgrade material as the process of example 1.

Example 3

The transition control process of the invention was applied to a fluidized bed with the following product changes: (a) Change in melt index:–71%; (b) Change in density: –0.011 g/cm$^3$; and (c) a decrease in temperature by 2° C. The catalyst type and bed level were not changed to make the new product grade. The transition was performed with the following changes:

(a) Set melt index to 23% less than the target product value;

(b) Set density setpoint to 0.002 g/cm$^3$ over target product density;

(c) Maintain temperature setpoint at same value as needed for initial product;

(d) Increase ethylene partial pressure by 6 psig while continuously calculating $H_2/C_2$ and $C_6/C_2$ setpoints based on melt index and density setpoint values; and (e) Open slow vent to release 8% of reactor gas inventory per hour.

After 2.5 hours, the melt index and density reached their setpoint values. The slow vent was then closed. The melt index and density setpoints were maintained. The $H_2/C_2$ and $C_6/C_2$ ratios were also maintained.

The melt index was then set to the value of the new product. The temperature was then reduced 2° C. to the target reaction temperature. The ethylene partial pressure was increased by 3 psig. The slow vent was opened for 45 minutes to release 8% of the gas inventory per hour, eliminating excess hydrogen from the reactor.

After 6 hours, the average density of the product being made in the bed was within acceptable limits of the target values. The density setpoint was then set to the value of the new product. All controls were switched to steady state.

Example 4

The control method of the invention was applied to a reactor operating at steady state. The steady state product has a target melt index setpoint of 104 dg/min and an acceptable product melt index of ±10 dg/min. around that setpoint. The desired product property distribution is to have 50% of the product melt index within the range of 99–109 dg/min.

At one period in the manufacture, the melt index of the product rose to a value above 109 dg/min. as measured by an in-line melt index device. The automatic control system changed the melt index setpoint to 99 dg/min. and calculated that the reactor contained an excess of hydrogen. The slow vent was opened to release 8% of the reactor gas inventory per hour.

After 45 minutes, the slow vent was closed. The melt index, as measured by the in-line sensor, returned to within the 50% central grade region. The melt index setpoint was returned to 104 dg/min. No off-grade resin was produced during the controlled period.

We claim:

1. A process for controlling a gas phase polymerization reaction in a reactor when changing from a first product made at a first set of conditions to a second product made at a second set of conditions, said process comprising the steps of:

(a) comparing the first product reaction temperature and the second product reaction temperature, change the product reaction temperature setpoint to the second product reaction temperature if said second product reaction temperature is lower than said first product reaction temperature, (b) setting a melt index setpoint that is either 0–150% higher or 0–70% lower than the desired second product melt index value, (c) setting a reaction temperature setpoint that is: 1°–15° C. above the desired second product reaction temperature if the second product melt index value is higher than the first product melt index value, or 1°–15° C. below the actual second product reaction temperature if the second product melt index is lower than the first product melt index, (d) setting a product rate-limiting reactant partial pressure setpoint that is: 1–25 psig either below the first product rate-limiting reactant partial pressure if the second product melt index value is higher than the first product melt index value, or above the first product rate-limiting reactant partial pressure if the second product melt index value is lower than the first product melt index value;

(e) maintaining said melt index setpoint, temperature setpoint, and rate-limiting reactant partial pressure setpoint values until said polymerization product exhibits an average melt index and average product density with an acceptable range from the desired second product melt index value and second product density value;

(f) changing said melt index setpoint to the desired second product melt index value;

(g) changing said product reaction temperature setpoint to a value that is: (i) 0°–15° C. above said desired second product reaction temperature if the second product melt index value is higher than the first product melt index value, or (ii) 0°–15° C. below said desired second product reaction temperature if the second product melt index value is lower than the first product melt index value;

(h) changing said rate-limiting partial pressure setpoint to a value that is: (i) 0–25 psig either below the desired second product rate-limiting partial pressure if the second melt index value is higher than the first melt index value, or (ii) 0–25 psig above the second product rate-limiting partial pressure if the second melt index value is lower than the first melt index value; and (i) changing the reaction temperature setpoint and the rate-limiting reactant partial pressure setpoint values to the desired second product reaction temperature and second rate-limiting reactant partial pressure value when the reaction product exhibits an average melt index value within acceptable limits of the second product melt index value,.

2. A process according to claim I in which the melt index of the first product is higher than the melt index of the second product and said process further comprises:

removing hydrogen from gas inventory within said reactor.

3. A process according to claim 2 wherein hydrogen is removed by:

venting 1–8 wt % per hour of said gas inventory.

4. A process according to claim 2 wherein hydrogen is removed by:

passing at least a portion of said gas inventory over a hydrogenation catalyst.

5. A process according to claim 1 wherein said rate-limiting reactant is ethylene.

6. A process as in claim 1 wherein said first product and said second product are within acceptable limits of the same desired product, and the polymerization reaction is in steady state manufacturing.

7. A process as in claim 6 wherein said first product is selected from the group consisting of ethylene homopolymers; propylene homopolymers; copolymers of ethylene and at least one $C_3$–$C_{12}$ alpha olefin; terpolymers of ethylene, and at least one $C_3$–$C_{12}$ alpha olefin and a diene.

8. A process as in claim 7 wherein said first product is selected from the group consisting of ethylene-propylene copolymers, ethylene-butene copolymers, ethylene-hexane copolymers, and ethylenepropylene-diene rubbers, copolymers of propylene and at least one $C_4$–$C_{12}$ alpha olefin, propylenehexane copolymers, polybutadiene, and polyisoprene.

9. A process as in claim 1 wherein said first product and said second product are of different product grades, and the polymerization reaction is changing conditions from making the first product to conditions for making the second product.

10. A process as in claim 1 wherein said first product is selected from the group consisting of ethylene homopolymers; propylene homopolymers; copolymers of ethylene and at least one $C_3$–$C_{12}$ alpha olefin; terpolymers of ethylene, and at least one $C_3$–$C_{12}$ alpha olefin and a diene.

11. A process as in claim 10 wherein said first product is selected from the group consisting of ethylene-propylene copolymers, ethylene-butene copolymers, ethylene-hexane copolymers, and ethylenepropylene-diene rubbers, copolymers of propylene and at least one $C_4$–$C_{12}$ alpha olefin, polybutadiene, and polyisoprene.

* * * * *